United States Patent
Freeston (10) Patent No.: US 12,264,061 B2
(45) Date of Patent: Apr. 1, 2025

(54) BACKUP VALVE FOR CLOSED TRANSFER COUPLER

(71) Applicant: Pentair Flow Technologies, LLC, Delavan, WI (US)

(72) Inventor: Ben Freeston, Littleport (GB)

(73) Assignee: Pentair Flow Technologies, LLC, Delavan, WI (US)

( * ) Notice: Subject to any disclaimer, the term of this patent is extended or adjusted under 35 U.S.C. 154(b) by 659 days.

(21) Appl. No.: 17/303,856

(22) Filed: Jun. 9, 2021

(65) Prior Publication Data
US 2021/0380396 A1    Dec. 9, 2021

Related U.S. Application Data

(60) Provisional application No. 62/705,066, filed on Jun. 9, 2020.

(51) Int. Cl.
| | |
|---|---|
| *B67D 3/00* | (2006.01) |
| *B67D 7/02* | (2010.01) |
| *F16K 1/12* | (2006.01) |
| *G05D 7/01* | (2006.01) |

(52) U.S. Cl.
CPC ......... *B67D 3/0058* (2013.01); *B67D 3/0035* (2013.01); *B67D 3/009* (2013.01); *B67D 7/0277* (2013.01); *B67D 7/0294* (2013.01); *F16K 1/126* (2013.01); *G05D 7/012* (2013.01)

(58) Field of Classification Search
None
See application file for complete search history.

(56) References Cited

U.S. PATENT DOCUMENTS

| | | | |
|---|---|---|---|
| 2008/0314930 A1 | 12/2008 | Green | |
| 2013/0292493 A1 | 11/2013 | Marsalek et al. | |
| 2015/0259188 A1* | 9/2015 | Smith | B67D 3/046 |
| | | | 222/478 |
| 2019/0144257 A1* | 5/2019 | James | A01C 23/007 |
| | | | 222/153.14 |

FOREIGN PATENT DOCUMENTS

| | | |
|---|---|---|
| WO | 2011119122 A1 | 9/2011 |
| WO | 2018115285 A1 | 6/2018 |
| WO | 2019039950 A2 | 2/2019 |

OTHER PUBLICATIONS

Extended European Search Report, European Application No. 21178556.3, dated Nov. 8, 2021, 11 pages.

* cited by examiner

*Primary Examiner* — Spencer E. Bell
(74) *Attorney, Agent, or Firm* — Husch Blackwell LLP (57) ABSTRACT

A probe assembly for a closed transfer system is provided. The probe assembly includes a base having a base air inlet, a probe having a base end and a probe end, at least one primary valve positioned at the probe tip, and at least one secondary valve. The probe defines a hollow air channel extending from the base end to the probe end including a probe tip, the base end being coupled to the base such that the hollow air channel is in fluid communication with the base air inlet and the probe tip. The at least one secondary valve is positioned at the base air inlet and configured to selectively allow air into the hollow air channel.

20 Claims, 11 Drawing Sheets

BACKUP VALVE FOR CLOSED TRANSFER COUPLER

RELATED APPLICATIONS

This application claims priority claims priority under 35 U.S.C. § 119 to U.S. Provisional Patent Application No. 62/705,066 filed on Jun. 9, 2020, the entire contents of which are incorporated herein by reference.

BACKGROUND

The invention relates to closed transfer systems and methods. Specifically, the invention relates to closed transfer systems and methods incorporating a coupler with a locking mechanism, a transfer mechanism, and a cleaning mechanism that can be used in connection with a closed transfer system.

Hazardous chemicals are frequently used in various applications, such as agriculture. While the hazardous chemicals may be effective when applied properly (e.g., pesticides applied to crops), overexposure may be undesirable. Therefore, regulations often govern the types of vessels and containers that can be used to store and transfer chemicals.

Hazardous chemicals are removed or transferred from their containers in the course of being used for their ultimate application. Because the chemicals may have undesirable impacts if improperly used or applied, spills and leaks during chemical transfer is preferably avoided. A closed transfer system can be used to efficiently transport chemicals from within their chemical containers toward other receptacles or dispensing mechanisms. Chemical containers can be coupled to a closed transfer system, which can use a pressure differential to motivate chemicals out of the container.

SUMMARY

Some embodiments provide a probe assembly for a closed transfer system. The probe assembly includes a base having a base air inlet, a probe having a base end and a probe end, a probe tip being located at the probe end, at least one primary valve positioned at the probe tip, and at least one secondary valve. The probe defines a hollow air channel extending from the base end to the probe end, the base end being coupled to the base such that the hollow air channel is in fluid communication with the base air inlet and the probe tip. The at least one secondary valve is positioned at the base air inlet and configured to selectively allow air into the hollow air channel.

In some forms, the base air inlet is provided in the form of a plurality of openings positioned in a radial array along an outer surface of the base. Each of the plurality of openings can be circular in shape. In some forms, each of the plurality of openings is configured to receive a corresponding secondary valve. The at least one secondary valve can be configured with a differential opening pressure that is less than or substantially equal to a differential opening pressure of the at least one primary valve. The at least one secondary valve can provide a volume of air flow substantially equal to or greater than a volume of air flow provided by the at least one primary valve.

In some forms, the probe comprises an outer tube having threads provided on the base end, the threads being sized and shaped to provide a fluid tight connection with threads provided on the base when the probe is releasably secured to the base. In some forms, the probe includes an outer tube having an inner wall and an inner tube positioned inside of the outer tube. An inside of the inner tube forms the hollow air channel and the inner tube includes an outer wall. An interstitial space is provided between the outer wall of the inner tube and the inner wall of the outer tube and defines a hollow liquid channel. The base can further include a base rinse inlet in fluid communication with the hollow liquid channel.

In some forms, the at least one primary one-way valve comprises an umbrella valve configured to allow air to flow from the hollow air channel out of the probe tip. In some forms, the at least one primary one-way valve is provided as a pair of umbrella valves configured to allow fluid to flow in parallel from the hollow air channel out of the probe tip. In some forms, the at least one secondary one-way valve comprises one umbrella valve. In some forms, the at least one secondary one-way valve comprises one poppet valve.

Some embodiments provide a probe assembly for a closed transfer system coupler, the coupler including a housing and a handle, and the coupler configured to couple a fluid filled container into a fluid tight configuration with the coupler, and selectively actuate the probe assembly to protrude at least partially into the container by actuation of the handle. The probe assembly includes a base having a base air inlet, a probe defining a hollow air channel extending from the base to a probe tip, at least one primary one-way valve positioned at the probe tip, and at least one secondary one-way valve. The hollow air channel can be in fluid communication with the base air inlet and the probe tip. The at least one secondary one-way valve is positioned at the base air inlet and configured to selectively allow air into the hollow air channel.

In some forms, the base includes an air chamber in fluid communication with the base air inlet and the hollow air channel. The air chamber can include a bottom surface that is positioned below the base air inlet to form a reservoir. The probe can be arranged along a longitudinal axis and the base air inlet can be tilted at an angle with respect to the longitudinal axis. In some forms, the at least one primary valve and the at least one secondary valve are configured as one-way valves. In some forms, the at least one primary valve is configured to selectively allow air to flow into the base air inlet and into an air chamber formed within the base, the air chamber being in fluid communication with the hollow air channel.

Some embodiments provide a probe assembly for a closed transfer system coupler configured to selectively engage a container coupled to the coupler in a fluid tight configuration. The probe assembly includes a base including a base air inlet, a probe defining a hollow air channel in fluid communication with the base air inlet, and at least one secondary valve configured to selectively allow air into the hollow air channel. The probe includes at least one primary valve.

Some embodiments provide a probe assembly for a closed transfer system coupler configured to selectively engage a container coupled to the coupler in a fluid tight configuration. The probe assembly includes a base having a base air inlet, a probe having a base end and a probe end, a probe tip being located at the probe end, at least one primary one-way valve positioned at the probe tip, and at least one secondary one-way valve. The probe defines a hollow air channel extending from the base end to the probe end, the base end being coupled to the base such that the hollow air channel is in fluid communication with the base air inlet and the probe tip. The at least one secondary one-way valve is located proximal to the at least one primary one-way valve and configured to selectively allow air to flow toward the probe tip.

These and other features of the disclosure will become more apparent from the following description of the illustrative embodiments.

Corresponding reference characters indicate corresponding parts throughout the several views. Although the drawings represent embodiments of the disclosure, the drawings are not necessarily to scale and certain features may be exaggerated in order to better illustrate and explain the embodiments of the disclosure.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Closed transfer systems are useful in chemical transfer applications to protect users from exposure to a chemical being transferred. Conventional closed transfer systems typically include at least a locking mechanism, a transfer mechanism, and a cleaning mechanism. The locking mechanism is designed to securely lock a container full of chemicals into a fluid tight configuration with a closed transfer system coupler. The closed transfer system allows air to be introduced into the container through a one-way valve to allow the chemical to empty from the container by gravity feed or vacuum suction. The cleaning mechanism provides a rinse solution to rinse out the container and to rinse off parts of the coupling mechanism that have been exposed to the chemical during transfer. All of these functions are performed in a fluid tight environment to prevent users from exposure.

In some conventional closed transfer systems, the one-way valve that introduces air into the chemical container cannot create a perfect fluid tight seal over many cycles of closed transfer system use or during the cleaning cycle. Thus, the one-way valve can leak small quantities of fluid over time. Thus, it can be useful to provide a backup valve that keeps any leaked fluid from exiting the system.

Figure 1:
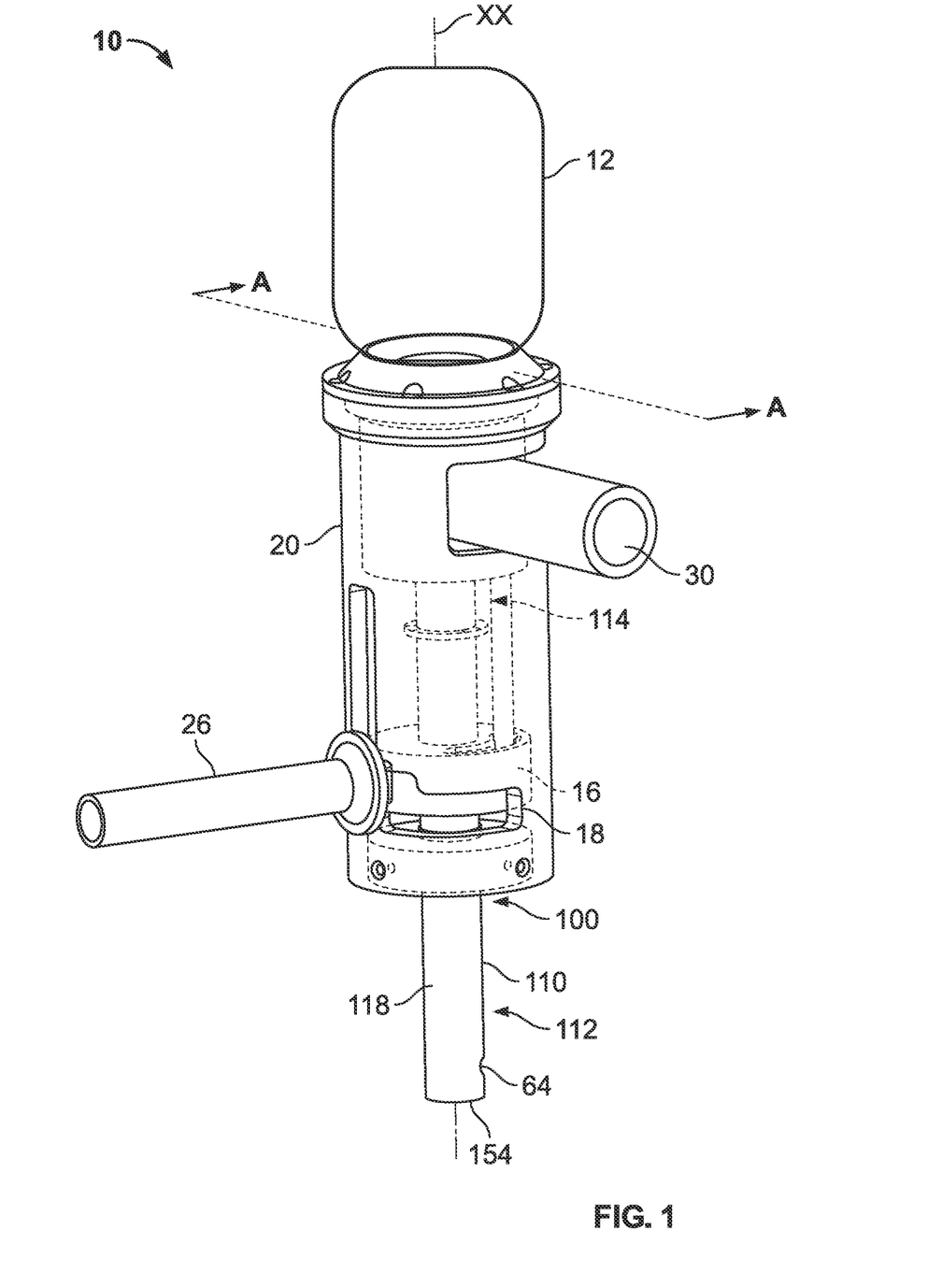
FIG. 1 is an isometric view of a closed transfer system coupler according to one embodiment.
Figure 2:
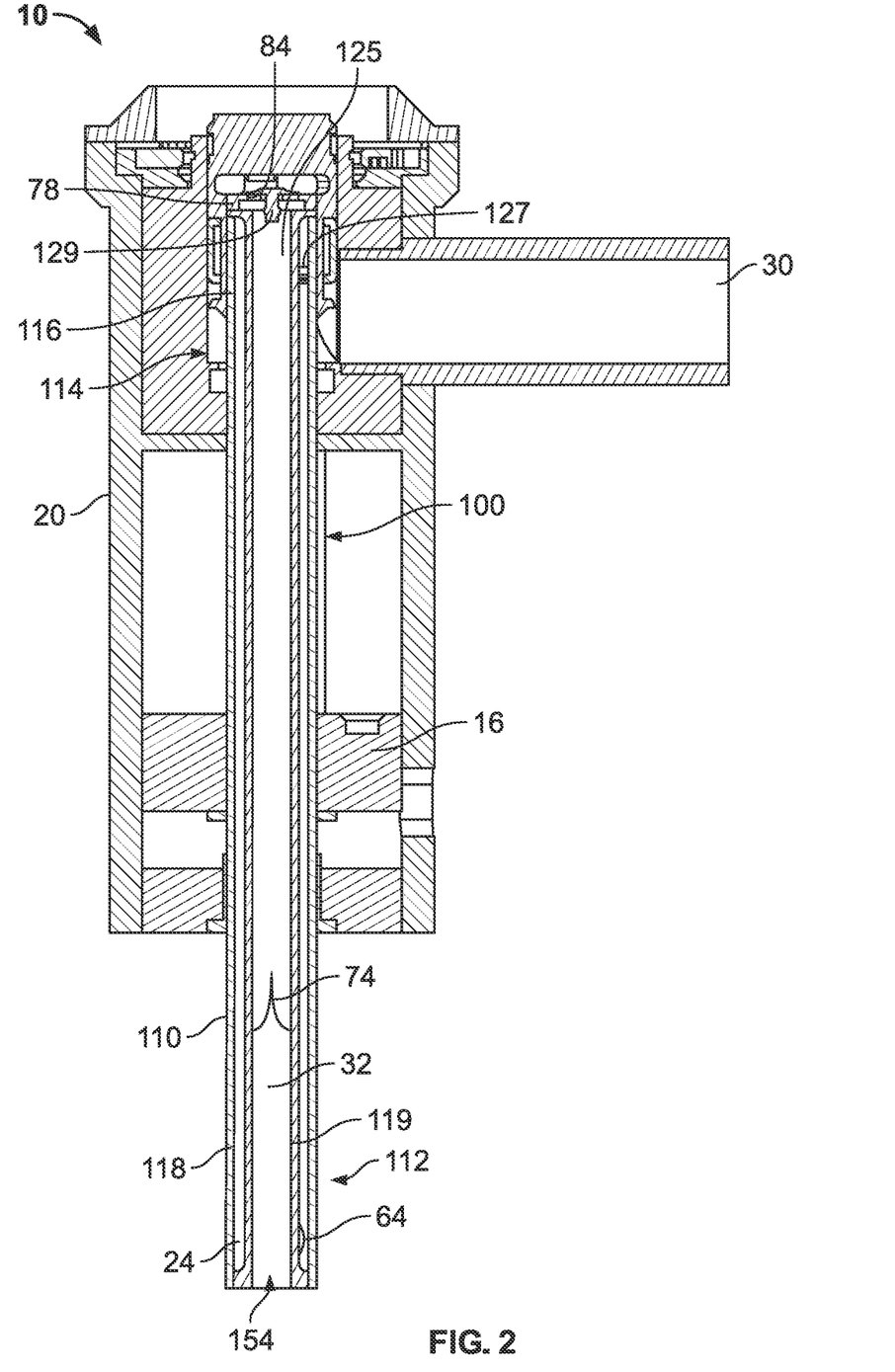
FIG. 2 is a cross-sectional view of the coupler of FIG. 1 taken along line A-A.
Figure 3:
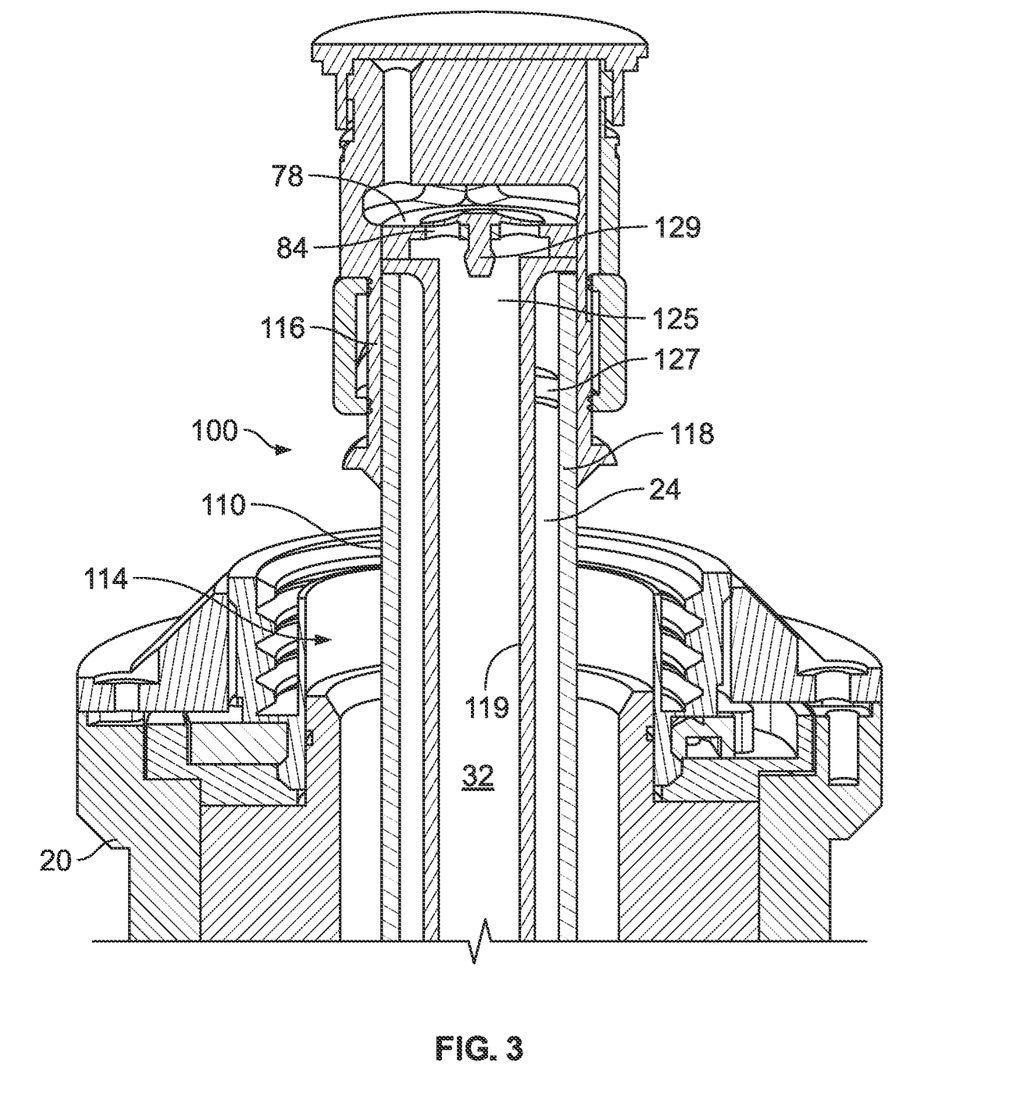
FIG. 3 is a partial cross-sectional view of a portion of the coupler of FIG. 1 in an open position.

FIGS. 1-3 illustrate a coupler 10 for a closed transfer system. The coupler 10 has a housing 20 that can be substantially cylindrical. The housing 20 includes a base rinse inlet 64 and an outlet 30 that each extend outwardly from the housing 20 to partially define a fluid flow path through the coupler 10. In some embodiments, the base rinse inlet 64 is provided on a bottom end of the housing 20 and is designed to be coupled to a water source, while the outlet 30 protrudes outwardly from an upper end of the housing 20 adjacent a container 12. The outlet 30 is designed to be coupled to a vacuum or pump to pull fluid (e.g., water or chemicals) from the housing 20 out of the outlet 30 and away from the coupler 10. The vacuum or pump can be omitted, as the outlet 30 can also remove fluid from the container 12 using gravity. In some embodiments, the base rinse inlet 64 and the outlet 30 each extend outwardly from the housing 20, and can be coupled to fluid sources and fluid receptacles, respectively. A probe assembly 100, which includes the base rinse inlet 64, is at least partially received within the housing 20 and can extend completely through the housing 20. The probe assembly 100 can selectively restrict fluid flow between the base rinse inlet 64 and the outlet 30. In some embodiments, the probe assembly 100 may be disposed entirely within the housing 20.

The probe assembly 100 includes a probe 110 that is provided in the form of an elongate tube with a longitudinal axis that aligns with the axis X-X. The probe 110 has a base end 112 and a probe end 114 that includes a probe tip 116. The probe 110 further includes an outer tube 118 and an inner tube 119. The inner tube 119 forms a hollow air channel 32. The inner tube 119 is positioned inside of the outer tube 118, forming a hollow liquid channel 24 in the interstitial space between the outer wall of the inner tube 119 and the inner wall of the outer tube 118. The inner tube 119 is open to atmosphere at the base end 112.

The probe assembly 100 can be moved relative to the housing 20 between a first position (shown in FIGS. 1 and 2) and a second position (shown in FIG. 3) along a longitudinal axis X-X. When the probe assembly 100 is in the first position, the probe tip 116 can be entirely received within the housing 20, and the coupler 10 is "closed." The probe assembly 100 is positioned within the fluid flow path between the container 12 and the outlet 30 to restrict the flow of water or chemicals out of the container 12.

To "open" the coupler 10, the probe assembly 100 can be moved to the second position. In the second position, the probe assembly 100 extends upwardly from the housing 20 further than in the first position, and can extend at least partially into the container 12 positioned above the coupler 10. When the probe assembly 100 is moved upwardly to the second position, the probe assembly 100 opens the flow path between the container 12 and the outlet 30, and the contents of the container 12 can flow to the outlet 30.

The probe assembly 100 can be moved between the first position and the second position using a handle 26 (see FIG. 1). The handle 26 can be coupled to the probe assembly 100, and can extend outwardly from the housing 20 to be manipulated by a user. In some embodiments, the handle 26 is coupled to a disk 16 that is received around the probe assembly 100 and positioned within the housing 20. The handle 26 can be rotated or raised, which in turn causes the disk 16 and probe assembly 100 to rotate or raise. In some embodiments, a slot 18 is formed in the housing 20 to restrict the allowable motion of the handle 26 (and probe assembly 100) relative to the housing 20.

After the contents of the container 12 are accessed by the coupler 10 and a desired amount of fluid can be emptied from the container 12, the container 12 and the coupler 10 can be rinsed. To perform the rinsing process, the coupler 10 is placed in communication with a water source (not shown). In some embodiments, the water source is coupled to the base rinse inlet 64, which can be formed as a hole extending through the outer tube 118 of the probe assembly 100. Rinse water is received through the base rinse inlet 64, which then fills and flows upwardly through a hollow liquid channel 24 formed within the probe assembly 100. In some embodiments, the inner tube 119 and outer tube 118 are positioned concentrically about the longitudinal axis X-X. Rinse water continues to travel upward in the hollow liquid channel 24 until it reaches a probe liquid outlet 127. The probe liquid outlet 127 can be provided as a slot extending through the outer tube 118 of the probe assembly 100, which allows water to exit the hollow liquid channel 24 and the probe assembly 100 to an external environment. In addition to providing rinse water, the probe assembly 100 provides air into the container 12, which aids the flow of liquid out of the container 12 to the outlet 30. In some embodiments, an inlet 154 is formed at the bottom of the inner tube 119 to supply ambient air from the environment.

Referring more particularly to the probe tip 116, the probe tip 116 includes a probe air outlet 125 and a probe liquid outlet 127, as best seen in FIG. 3. The probe air outlet 125 includes at least one primary one-way valve 129, such as an elastomer umbrella valve, to prevent the back flow of liquid into the probe tip 116. In some forms, the probe air outlet 125 is configured to provide a single fluid path or a plurality of fluid paths in parallel, each having a respective one-way valve to prevent the back flow of liquid into the probe tip 116.

In some instances, the primary valve 129 is provided in the form of a one-way umbrella valve. The primary valve 129 is coupled to a perforated plate 78 and selectively covers and uncovers through-holes 84 during use. When the pressure differential between the air within the inner tube 119 (which is approximately atmospheric) and the fluid within the container 12 crosses a threshold value, air is sucked into the inlet 154 and upward through the inner tube 119. The pressure differential causes the resilient elastomeric material of the primary valve 129 to flex upward, uncovering the through-holes 84 in the perforated plate 78.

Referring further to FIG. 2, in some forms, in addition to the at least one primary one-way valve 129, the probe assembly 100 includes at least one secondary one-way valve 74. The primary valve 129 is designed to interface directly with the fluid inside of the container 12, releasing ambient air into the container 12 while preventing the backflow of fluid chemicals into the probe 110. In some embodiments, one or more one-way valves can function as primary valves 129 that interface directly with the container fluid. The size, shape, and number of primary valves 129 is selected to provide for a sufficient volume of air flow into the container 12.

The secondary one-way valve 74 acts as a second backup barrier to prevent fluid from the container 12 from leaking into the probe 110. The secondary valve 74 can also temporarily take over for the function of the primary valve 129 in the instance of complete primary valve 129 failure. The secondary valve 74 is positioned upstream of the primary valve 129 such that air flows in through the inlet 154 and past the secondary valve 74 toward the primary valve 129 when fluid is emptying from the container 12, and the secondary valve 129 can be located at any number of positions between the base end 112 and the probe tip 116 substantially proximal to the primary valve 129. The secondary valve 74 interfaces with the container fluid only indirectly, when fluid leaks through the primary valve 129. In some embodiments, one or more one-way valves can function as secondary valves 74 that do not interface directly with the container fluid. In some instances, the secondary valve 74 is provided in the form of a duck bill valve. The size, shape, and number of secondary valves 74 is selected to ensure that backflow past the secondary valve 74 is prevented. The opening pressure of the secondary valve 74 is designed with a differential opening pressure that is substantially equal to or lower than the differential opening pressure of the primary valve 129 so that the secondary valve 74 has little to no impact on the performance of the primary valve 129. The secondary valve 74 is also designed to provide a volume of air flow at a substantially equal to or greater flow rate than the primary valve 129 so as not to throttle the primary valve 129.

Figure 4A:
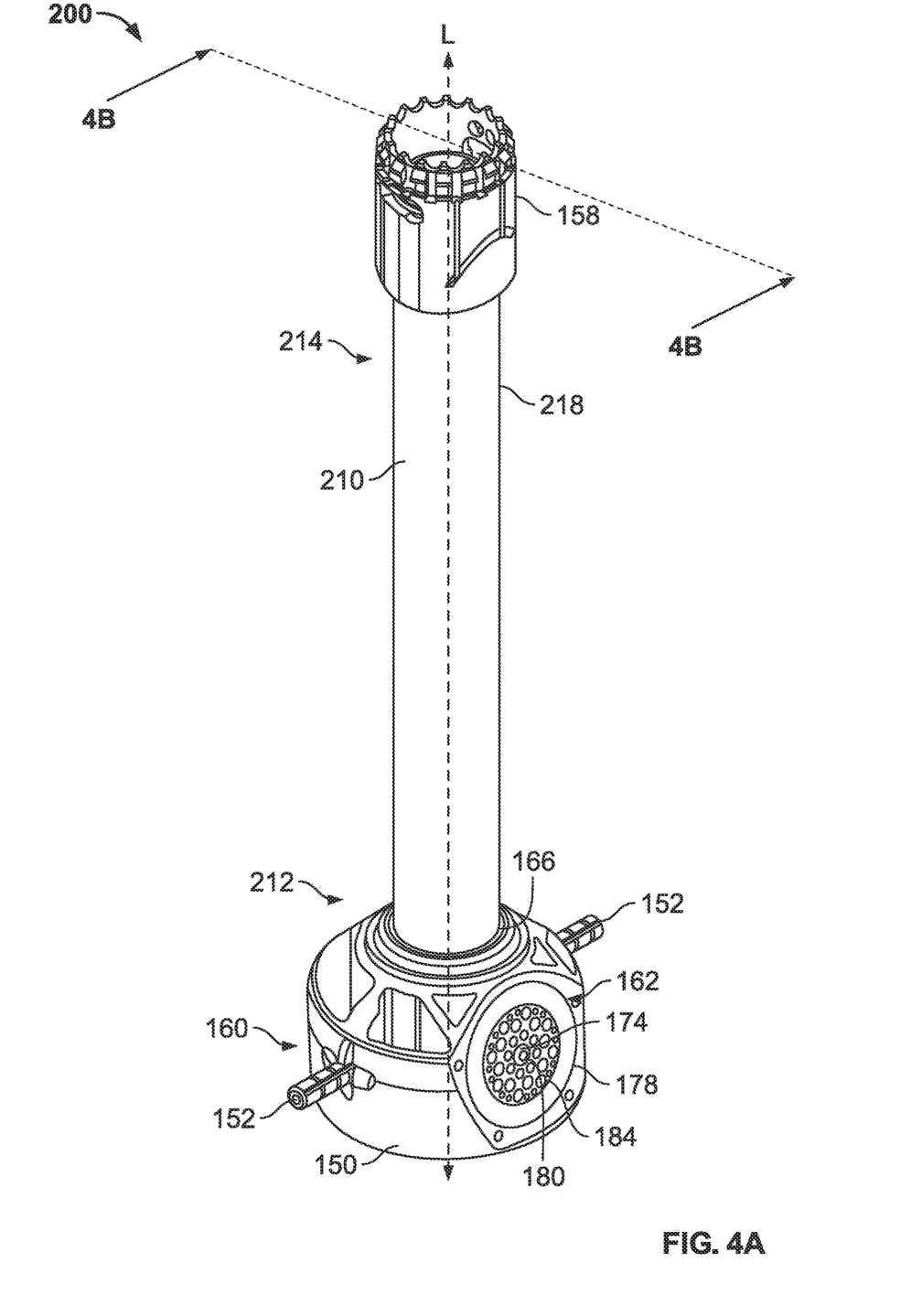
FIG. 4A is an isometric view of a probe assembly of a coupler according to one embodiment.
Figure 4B:
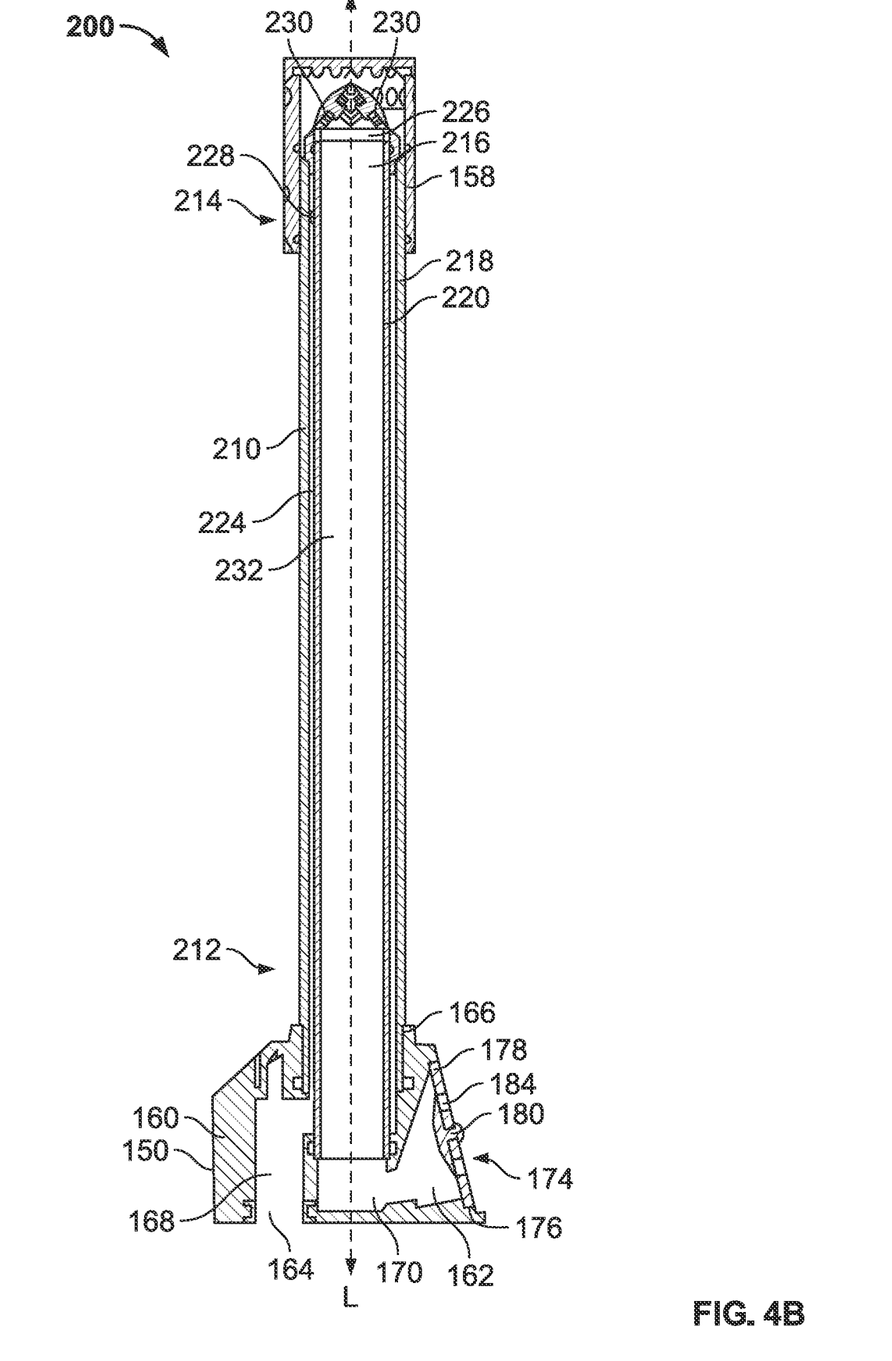
FIG. 4B is a cross-sectional view of the probe assembly of FIG. 4A taken along line 4B-4B.
Figure 5:
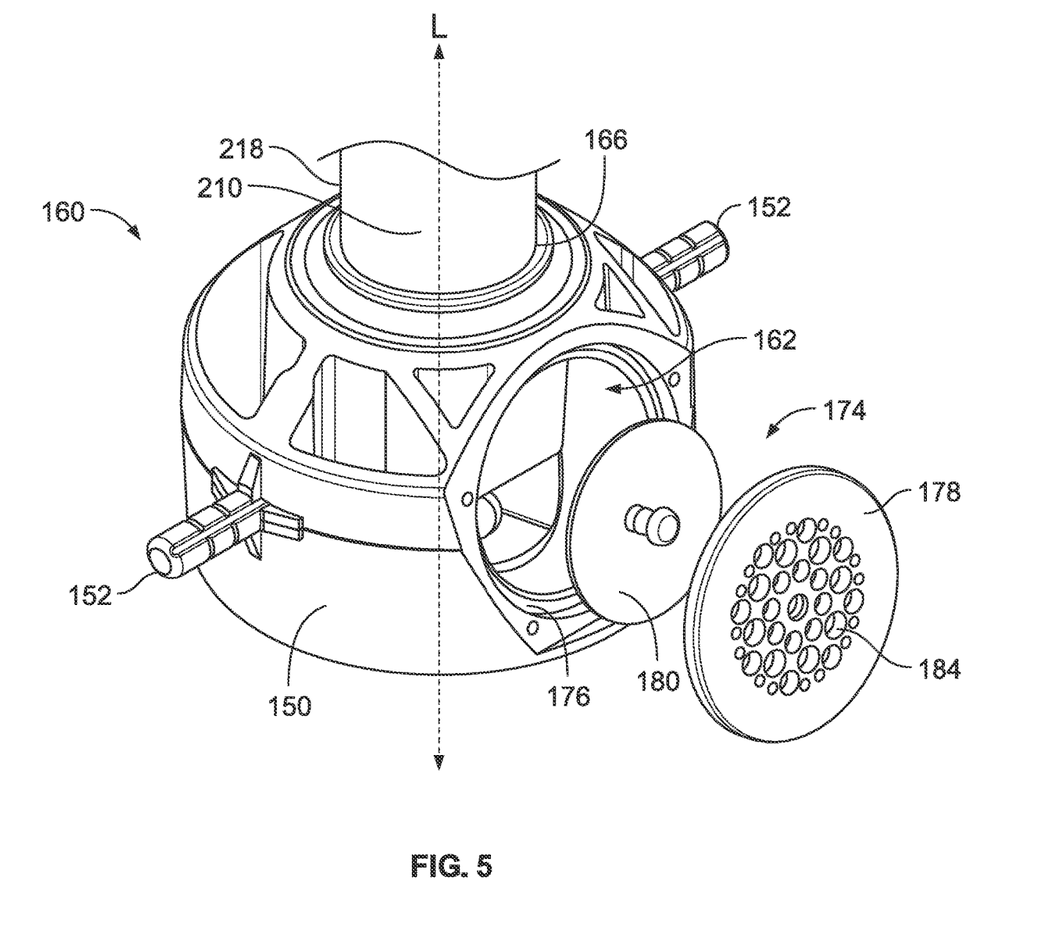
FIG. 5 is a partial exploded view of a base end of the probe assembly of FIG. 4.
Figure 6:
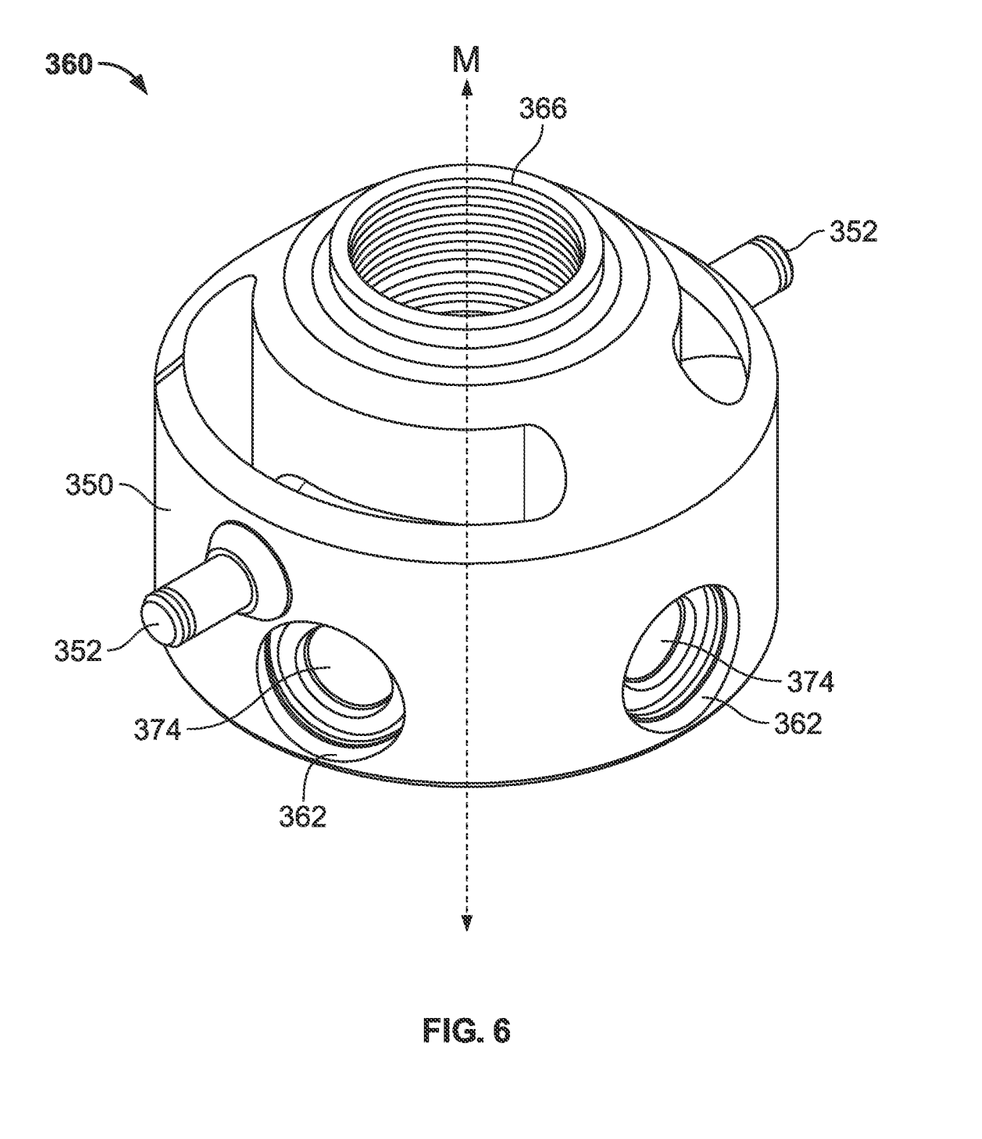
FIG. 6 is a partial isometric view of a base end of a probe assembly of a closed transfer system coupler according to another embodiment of the invention.

FIGS. 4-6 illustrate an alternative probe assembly 200 that can be integrated into a coupler for a closed transfer system such as the coupler 10 of FIGS. 1-3 or a coupler 500 of FIG. 10 described below. The probe assembly 200 includes a base 160, a probe 210, a rotatable nozzle 158, one or more primary one-way valves 230, and a secondary one-way valve 174. As shown in FIGS. 4A and 4B, the probe 210 is provided in the form of an elongate tube with a longitudinal axis that aligns with the axis L. The probe 210 has a base end 212 and a probe end 214 that includes a probe tip 216 (see FIG. 4B). The probe 210 further includes an outer tube 218 and an inner tube 220. The inner tube 220 forms a hollow air channel 232. The inner tube 220 is positioned inside of the outer tube 218, forming a hollow liquid channel 224 in the interstitial space between the outer wall of the inner tube 220 and the inner wall of the outer tube 218. The outer tube 218 of the probe 210 is sized and shaped to be received within a bore 166 and provide a fluid tight connection with the base 160. In one instance, the outer tube 218 can include threads provided on the base end 212 to screw into threads provided in the bore 166. The outer tube 218 can also be sized and shaped to press fit into the bore 166, or a fluid tight junction between the outer tube 218 and the bore 166 can otherwise be provided by conventionally known structures and methods.

The base 160 includes a base air inlet 162, a base rinse inlet 164 (see FIG. 4B), and the bore 166 designed to receive the probe assembly 200. The base 160 defines a cylindrical outer surface 150 with a center point that aligns with the longitudinal axis L. Two posts 152 protrude outwardly and away from the outer surface 150 along an axis that is perpendicular to axis L. The center point of the bore 166 aligns with the axis L.

The base 160 further includes a liquid chamber 168 (see FIG. 2) in fluid communication with the base rinse inlet 164 and an air chamber 170 in fluid communication with the base air inlet 162. The base air inlet 162 is provided in the form of a circular opening that is positioned on the outer surface 150. The base air inlet 162 is titled at an angle from axis L with the top of the base air inlet 162 angled toward the center of the base 160, extending inwardly from the outer surface 150. The bottom surface of the air chamber 170 is partially sloped downwardly and away from the base air inlet 162 and is positioned slightly below the bottom of the base air inlet 162, forming a shallow reservoir. Thus, if a small amount of liquid falls into the air chamber 170 from the probe 210, the fluid will reside at the bottom surface of the air chamber 170 away from the base air inlet 162 when the coupler 10 is upright. In some forms, the bottom surface of the air chamber 170 is perpendicular to the axis L and the base air inlet 162 is parallel to the axis L when the coupler 10 is upright. In some forms, the air chamber 170 includes a reservoir that extends downward from the bottom surface of the air chamber 170 to catch any liquid that falls from the probe 210.

Referring to FIG. 4B, the probe tip 216 includes a probe air outlet 226 and a probe liquid outlet 228. The probe air outlet 226 provides two parallel fluid paths leading out of the probe tip 216. Each fluid path includes a corresponding primary valve 230, such as an elastomer umbrella valve, to prevent the back flow of liquid into the probe tip 216. In some forms, the probe air outlet 226 is configured to provide a single fluid path or a plurality of fluid paths in parallel, each having a respective primary valve 230 to prevent the back flow of liquid into the probe tip 216. The size, shape, and number of primary valves 230 is selected to provide for a sufficient volume of air flow into the container 12. When the probe 210 is coupled to the bore 166, the hollow air channel 232 of the inner tube 220 is in fluid communication with the base air inlet 162 and the air chamber 170. Also, when the probe 210 is coupled to the bore 166, the hollow liquid channel 224 is in fluid communication with the base rinse inlet 164 and the liquid chamber 168.

The primary valves 230 are designed to interface directly with the fluid inside of the container 12, releasing ambient air into the container 12 while preventing the backflow of fluid chemicals into the probe 210. The secondary valve 174 is a second backup barrier designed to prevent fluid from the container 12 leaking into the probe 210. The secondary valve 174 is positioned upstream of the primary valve 230 such that air flows past the secondary valve 174 toward the primary valve 230 when fluid is emptying from the container 12. The secondary valve 174 interfaces with the container fluid only indirectly, when fluid leaks through the primary valve 230. The size, shape, and number of secondary valves 174 is selected to ensure that backflow past the secondary valve 174 is prevented. The opening pressure of the secondary valve 174 is designed with a differential opening pressure that is substantially equal to or lower than the differential opening pressure of the primary valve 230 so that the secondary valve 174 has little to no impact on the performance of the primary valve 230. The secondary valve 174 is also designed to provide a volume of air flow at a substantially equal to or greater flow rate than the primary valve 230 so as not to throttle the primary valve 230.

The secondary valve 174 is fitted into the base air inlet 162 to selectively allow air into the air chamber 170 of the base 160. As shown in FIG. 5, a recessed ledge 176 is formed around the rim of the base air inlet 162. The recessed ledge 176 is sized and shaped to receive a perforated plate 178. The perforated plate 178 is seated into and coupled to the recessed ledge 176 forming a fluid tight seal. An elastomer umbrella valve 180 is coupled to the perforated plate 178 and positioned so the canopy of the umbrella valve 180 selectively covers and uncovers through-holes 184 provided in the perforated plate 178. The umbrella valve 180 is oriented to extend into the air chamber 170, thus acting as a one-way valve at the base air inlet 162. In some embodiments, the secondary valve 174 is provided in the form of another type of one-way valve such as a poppet valve, ball valve, or other check valve that opens under a low pressure differential and provides a sufficient volume of air flow for evacuation of fluid from the container 12. In some forms, one or more parts of the secondary valve 174 are molded or machined integrally into the base 160. In some forms, the secondary valve 174 is located in any number of positions along the air pathway between the base air inlet 162 to the primary valves 230 to act as a backup for primary valves 230. In some forms, the secondary valve 174 is in fluid communication with the hollow air channel 232 of the inner tube 220, but is positioned within the housing 20 at a location offset from the probe assembly 200.

Figure 7:
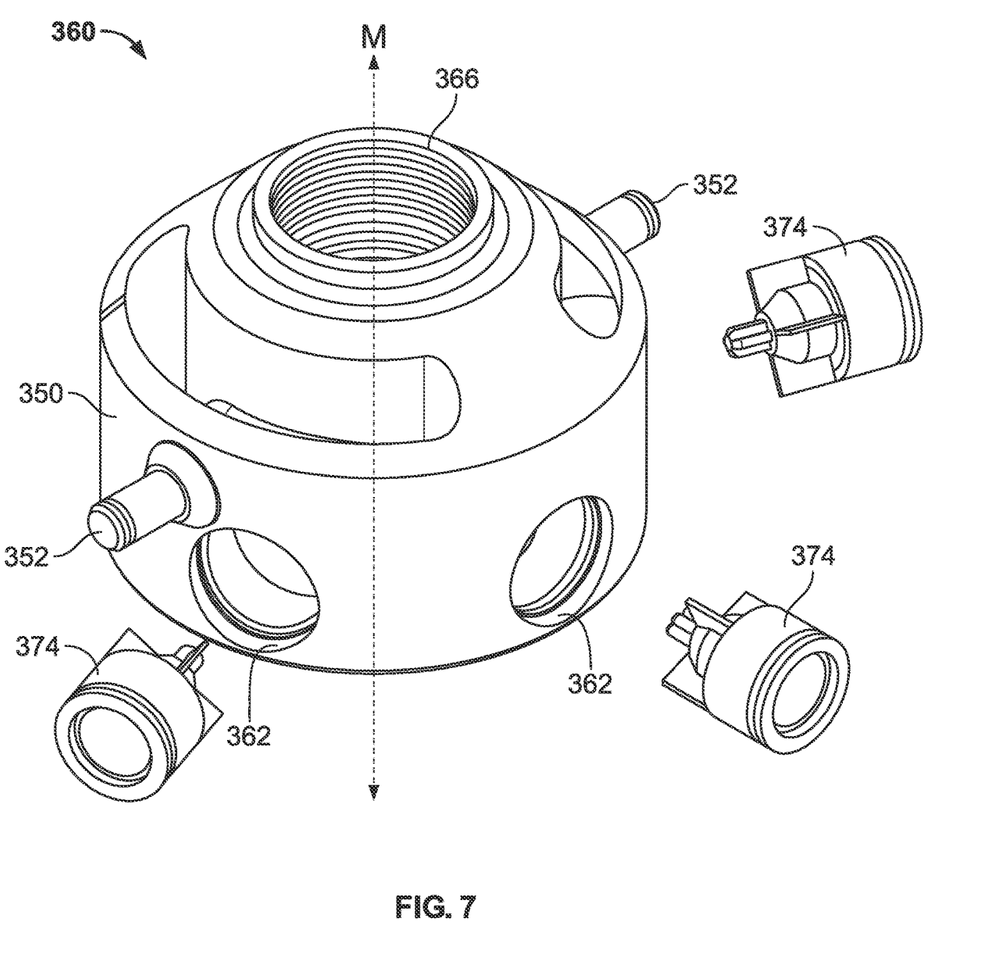
FIG. 7 is a partial exploded view of the base end of FIG. 6.

FIGS. 6 and 7 illustrate an alternative base 360 for the probe assembly 200. The base 360 includes a plurality of base air inlets 362, a base rinse inlet (not shown), and a bore 366 designed to receive the probe assembly 200. Two posts 352 extend outwardly on opposing sides of the base 360 and away from an outer surface 350 along an axis that is perpendicular to longitudinal axis M. The posts 352 are designed to interface with the housing 20. Similar to the base 160, the base 360 includes a liquid chamber (not shown) in fluid communication with the base rinse inlet (not shown) and an air chamber (not shown) in fluid communication with the base air inlets 362. The base air inlets 362 are provided in the form of circular openings that are positioned in a radial array along the outer surface 350. One-way secondary valves 374 are sized to correspond to the base air inlets 362 and are fitted into the base air inlets 362 to selectively allow air into the air chamber (not shown) of the base 360. The secondary valves 374 are provided in the form of poppet valves. In some embodiments, the secondary valves 374 are provided in the form of another type of one-way valve such as an elastomer umbrella valve or other check valve that opens under a low pressure differential and provides a sufficient volume of air flow for evacuation of fluid from the container 12. In some forms, one or more parts of the secondary valves 374 are molded or machined integrally into the base 360. If, during use, any small amount of fluid leaks through the primary valves 230, the secondary valves 374 act as backup valves to prevents the fluid from exiting the coupler 10, thus providing additional user protection. In some forms, providing multiple secondary valves 374 in lieu of a single, larger secondary valve, like the secondary valve 174 of the base 160, can save space within the housing 20, which provides a more compact arrangement for the base 360.

Figure 8:
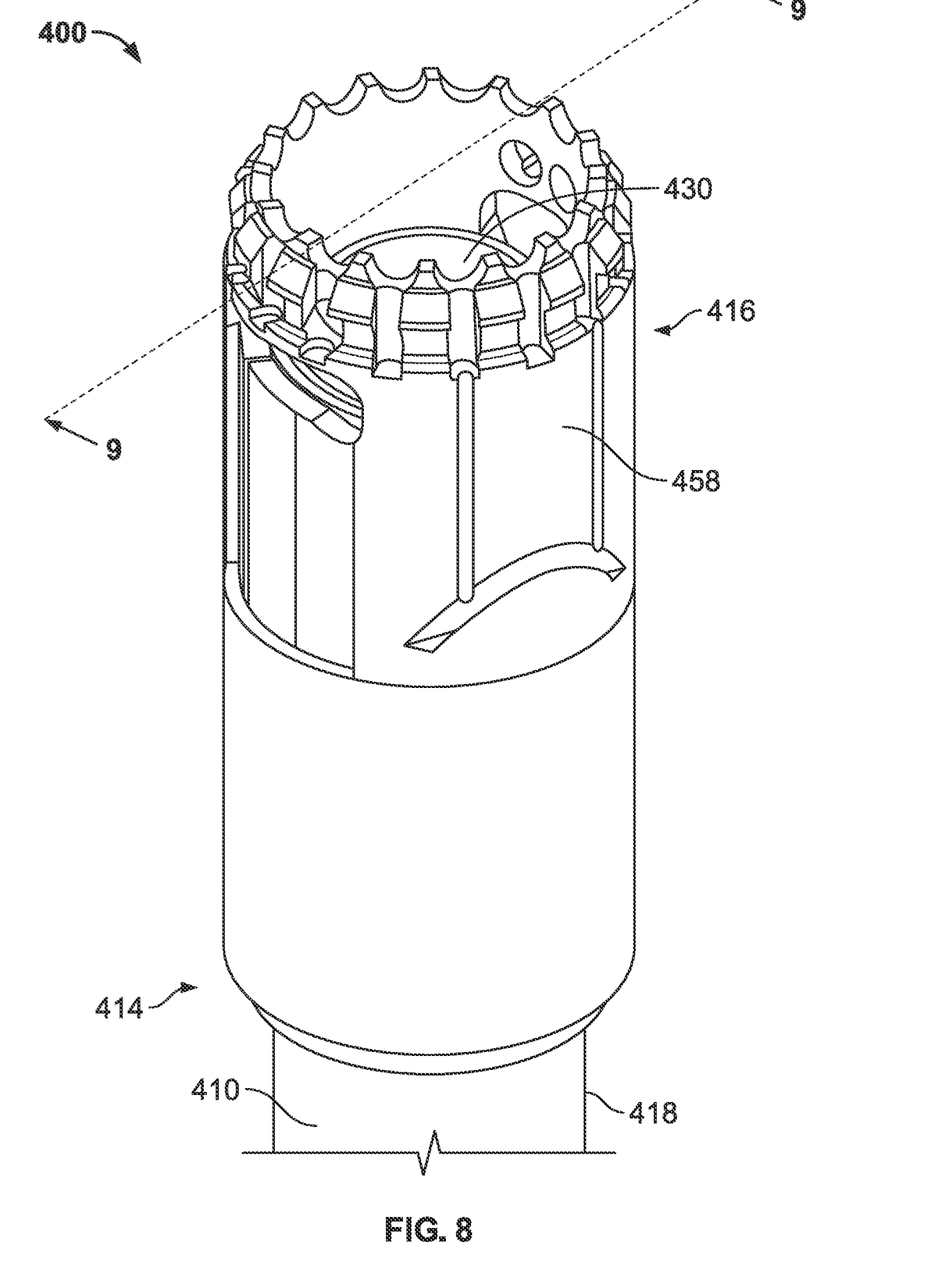
FIG. 8 is a partial isometric view of a probe end of a probe assembly of a closed transfer system coupler according to one embodiment.
Figure 9:
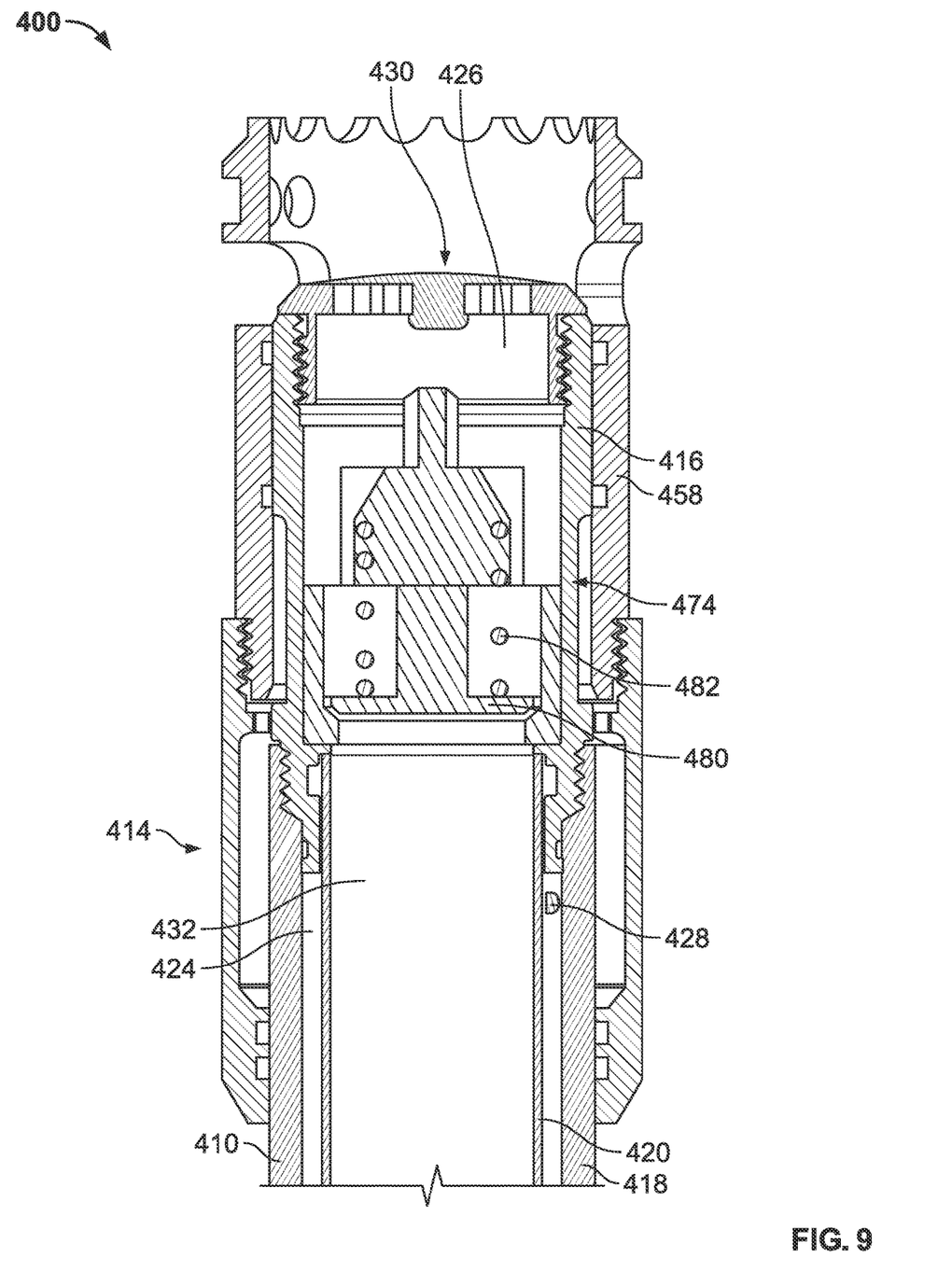
FIG. 9 is a partial cross-sectional view of the probe assembly of FIG. 8 taken along line 9-9.
Figure 10:
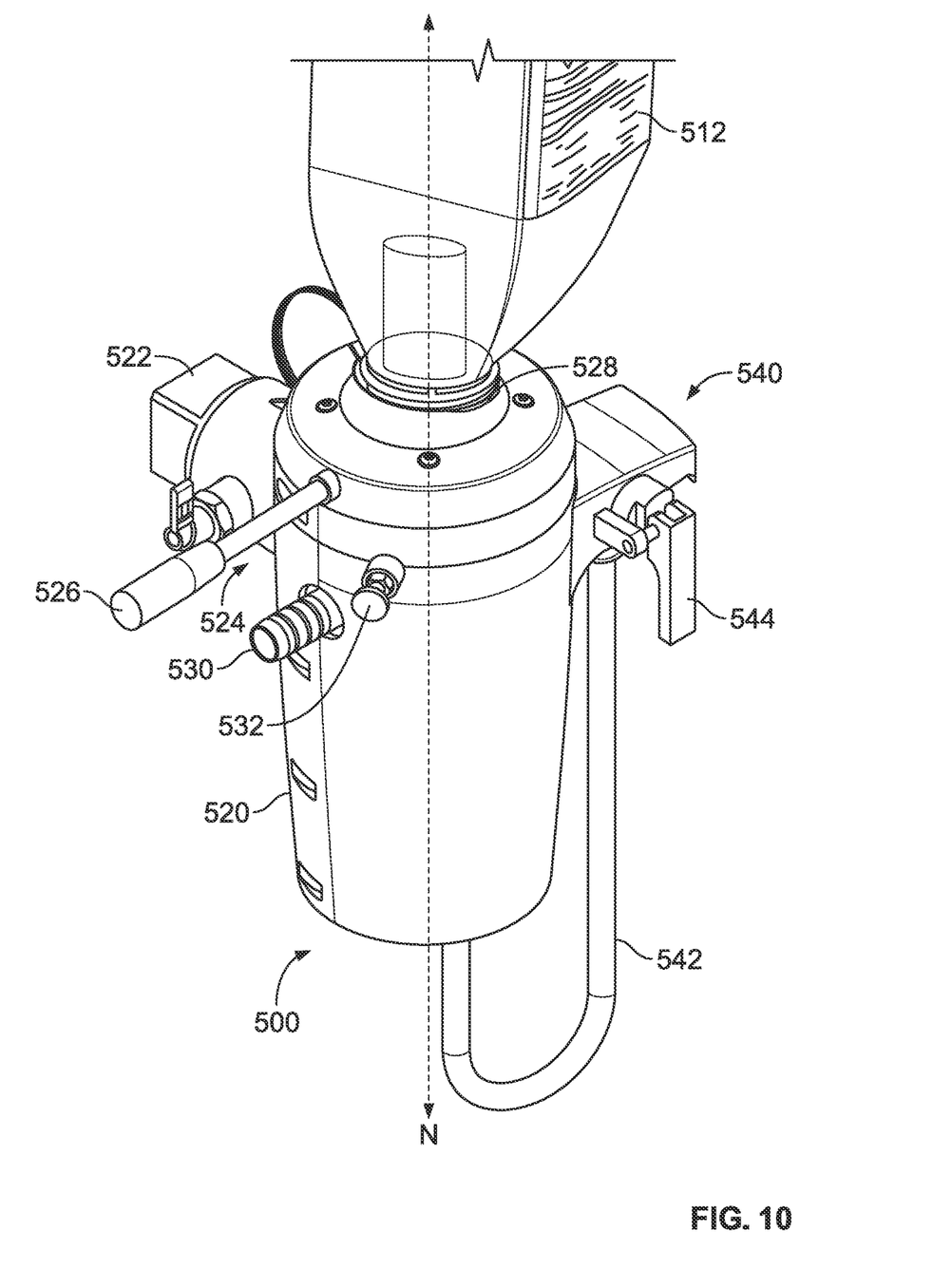
FIG. 10 is an isometric view of a closed transfer system coupler according to one embodiment.

FIGS. 8 and 9 illustrate an alternative probe assembly 400 that can be integrated into a coupler for a closed transfer system such as the coupler 10 of FIGS. 1-3 or the coupler 500 of FIG. 10. The probe assembly 400 includes a base (not shown), a probe 410, and a rotatable nozzle 458. The probe 410 has a base end (not shown) and a probe end 414 that includes a probe tip 416. The probe 410 further comprises an outer tube 418 and an inner tube 420. The inner tube 420 forms a hollow air channel 432. The inner tube 420 is positioned inside of the outer tube 418, forming a hollow liquid channel 424 in the interstitial space between the outer wall of the inner tube 420 and the inner wall of the outer tube 418. The probe tip 416 includes a probe air outlet 426 and a probe liquid outlet 428. The probe air outlet 426 includes a one-way primary valve 430, such as an elastomer umbrella valve covering a perforated disc, to prevent back flow of fluid into the probe tip 416. In some forms, the probe air outlet 426 is configured to provide a plurality of air paths in parallel, each having a respective one-way primary valve 430 to prevent back flow through the probe tip 416 and into the hollow air channel 432.

As shown in FIG. 9, a one-way secondary valve 474 is disposed within the hollow air channel 432 at the probe end 414 of the probe 410, upstream of, and beneath, the primary valve 430. The secondary valve 474 can be located proximal to the primary valve 430 and can be provided in the form of a poppet valve having a piston 480 and a spring 482. The location of the secondary valve 474 can be optimized by varying the distance between the secondary valve 474 and the primary valve 430. In some forms, the secondary valve 474 is positioned directly adjacent to the primary valve 430. In some forms, the secondary valve 474 is located in any number of positions along the hollow air channel 432 to act as a backup for the primary valve 430. The opening pressure of the secondary valve 474 is designed with a differential opening pressure that is substantially equal to or lower than the differential opening pressure of the primary valve 430 so that the secondary valve 474 has little to no impact on the performance of the primary valve 430. The secondary valve 474 is also designed to provide a volume of air flow at a substantially equal to or greater flow rate than the primary valve 430 so as not to throttle the primary valve 430.

The secondary valve 474 selectively controls the flow of air out of the probe air outlet 426 when it is urged open by differential pressure. If, during use, any small amount of fluid leaks through the primary valve 430, the secondary valve 474 prevents the fluid from exiting the coupler 10, thus providing additional user protection. In some embodiments, the secondary valve 474 is provided in the form of another type of one-way valve such as an umbrella valve or other check valve that opens under a low pressure differential and provides a sufficient volume of air flow for evacuation of fluid from the container 12. In some forms, one or more parts of the secondary valve 474 are molded or machined integrally into the inner tube 420 or the probe tip 416.

The embodiments described herein should not be construed as limiting with respect to the specific parts described for said embodiment. For example, the base 160, 360, can be configured for use with any of the probe assemblies 100, 200, 400 described herein, or with other probe assemblies in other closed transfer systems where appropriate. Further, any of the probe assemblies 100, 200, 400 can be configured with the features of any of the probe tips 116, 216, 416. In some forms, the probe assembly 100, 200, 400 includes more than one of the disclosed secondary valves 74, 174, 374, 474, and in other forms, the probe assembly 100, 200, 400 only includes one of the disclosed secondary valves 74, 174, 374, 474.

FIG. 10 illustrates an alternative coupler 500 within which any of the aforementioned probe assemblies 100, 200, 400, and embodiments can be integrated. The coupler 500 includes a housing 520 with a mounting bracket 522 designed to physically secure the coupler 500 to a structure such as a chemical sprayer. The housing 520 is defined by a substantially cylindrical sidewall and provided with a longitudinal axis N. A locking mechanism 524 is provided on the distal end of the housing 520 to receive and secure a container 512. The locking mechanism 524 includes a handle 526, and an opening 528 to receive a cap of the container 512. Once the cap of the container 512 is fitted to the coupler 500, the handle 526 is rotated radially about the coupler 500, and the locking mechanism 524 firmly secures the cap of the container 512 into a fluid tight configuration with the coupler 500. The coupler 500 further includes an outlet 530 protruding outwardly from the outer wall of the housing 520. The outlet 530 can be coupled to a pump to provide vacuum suction at the outlet 530, which allows the fluid that has drained from the container 512 into the coupler 500 to be transferred to a sprayer or other chemical application mechanism (not shown). Once the locking mechanism 524 has been actuated, the handle 526 can be further rotated, which selectively actuates the probe assembly 100, 200, 400 to initiate the chemical transfer mechanism. Actuation of the probe assembly 100, 200, 400 allows fluid chemicals to flow out of the container 512 to the outlet 530 without exposing the user to the chemical, as described in further detail below.

The coupler 500 further includes an integrated cleaning mechanism 540 extending from the outer wall of the housing 520. The cleaning mechanism 540 includes a rinse water line 542 and a control valve 544. A pressurized source of rinse water can be coupled to the rinse water line 542 so that when the control valve 544 is actuated, rinse water is provided to the probe assembly (e.g., one of probe assemblies 100, 200, 400) through the rinse water line 542. The coupler 500 also includes a cap rinse lock 532, which prevents the container 512 from decoupling from the coupler 500 while the container cap is being rinsed.

When outfitted with the probe assembly 100, 200, 400 the coupler 10, 500 is designed to function as follows. In use, the container 12, 512 is placed upside down so that the cap of the container 12, 512 is received into the coupler 10, 500. A locking mechanism is activated to secure the cap of the container 12, 512 and fluidly couple the container 12, 512 to the outlet 30, 530. Once the container 12, 512 is securely coupled to the coupler 10, 500 the handle 26, 526 can be further rotated and/or axially raised (coupler 10). Upon rotating and/or raising the handle 26, 256 the probe assembly 10, 200, 400 moves upwardly within the housing 20, 520 so that the probe tip 116, 216, 416 selectively engages and penetrates into the container 12, 512. After the probe tip 116, 216, 416 is inside of the container 12, 512, the chemical within the container 12, 512 begins to flow out of the outlet 30, 530 and differential pressure causes ambient air to flow into the probe assembly 10, 200, 400 through the base air inlet 162, 362 (or inlet 154) past the secondary valve 74, 174, 374, 474 through the hollow air channel 32, 232, 432, out of the probe air outlet 125, 226, 426 past the primary valves 129, 230, 430 and into the container 12, 512.

In some instances, fluid from the container 12, 512, the pressurized rinse water, or a mixture of both can leak small amounts past the primary valves 129, 230, 430 back through the probe tip 116, 216, 416 and into the hollow air channel 32, 232, 432. The secondary valve 74, 174, 374, 474 acts as a backup valve to prevent any traces of fluid from exiting the coupler 10, 500 thus providing additional user protection from chemical exposure.

After the contents of the container 12, 512 are accessed by the coupler 10, 500 and a desired amount of fluid can be emptied from the container 12, 512 the container 12, 512 and the coupler 10, 500 can be rinsed. To perform the rinsing process, the coupler 10, 500 is placed in communication with a water source (not shown). In some embodiments, the water source is coupled to the base rinse inlet 64, 164. Rinse water is received through the base rinse inlet 64, 164, which then fills and flows upwardly through the hollow liquid channel 24, 224, 424 formed within the probe assembly 100, 200, 400. In some embodiments, the inner tube 119, 220, 420 and the outer tube 118, 218, 418 are positioned concentrically about the longitudinal axis X-X, L, M, N. Rinse water continues to travel upward in the hollow liquid channel 24, 224, 424 until it reaches the probe liquid outlet 127, 228, 428. The probe liquid outlet 127, 228, 428 can be provided as a slot extending through the outer tube 118, 218, 418 of the probe assembly 100, 200, 400, which allows water to exit the hollow liquid channel 24, 224, 424 and the probe assembly 100, 200, 400 to an external environment. In addition to providing rinse water, the probe assembly 100, 200, 400 provides air into the container 12, 512 which aids the flow of liquid out of the container 12, 512 to the outlet 30, 530.

Thus, an improved coupler for a closed transfer system is provided. The coupler can include a probe assembly with one or more one-way primary valves for allowing air to flow into a container to be emptied of a fluid. One or more secondary one-way valves can be located upstream of the one or more one-way valves. Accordingly, if, during use, any fluid leaks past the primary valve into the probe assembly, the secondary valve can prevent fluid from exiting the coupler. These benefits among other benefits are provided by this disclosure.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A probe assembly for a closed transfer system, the probe assembly comprising:
   a base including a base air inlet, a base rinse inlet, and an interior wall;
   a probe having a base end and a probe end, a probe tip positioned at the probe end, the probe defining a hollow air channel extending from the base end to the probe end, the base end being coupled to the base such that the hollow air channel is in fluid communication with the base air inlet and the probe tip;
   at least one primary valve positioned at the probe tip; and
   at least one secondary valve positioned proximate the base air inlet, wherein
   the internal wall
     partially defines the base rinse inlet, and
     separates the base rinse inlet from the base air inlet.

2. The probe assembly of claim 1, wherein the base air inlet is provided in the form of a plurality of openings positioned in a radial array along an outer surface of the base.

3. The probe assembly of claim 1, wherein the at least one secondary valve is configured to selectively allow air into the hollow air channel.

4. The probe assembly of claim 2, wherein each of the plurality of openings is configured to receive a corresponding secondary valve.

5. The probe assembly of claim 1, wherein the at least one secondary valve comprises a poppet valve.

6. The probe assembly of claim 1, wherein the at least one secondary valve is configured with a differential opening pressure that is less than or substantially equal to a differential opening pressure of the at least one primary valve.

7. The probe assembly of claim 1, wherein the at least one secondary valve provides a volume of air flow substantially equal to or greater than a volume of air flow provided by the at least one primary valve.

8. The probe assembly of claim 1, wherein the probe comprises an outer tube having threads provided on the base end, the threads being sized and shaped to provide a fluid tight connection with threads provided on the base.

9. The probe assembly of claim 1, wherein the probe comprises:
   an outer tube having an inner wall; and
   an inner tube positioned inside of the outer tube, an inside of the inner tube forming the hollow air channel, the inner tube including an outer wall,
   wherein an interstitial space between the outer wall of the inner tube and the inner wall of the outer tube forms a hollow liquid channel.

10. The probe assembly of claim 9, wherein the base rinse inlet is in fluid communication with the hollow liquid channel.

11. The probe assembly of claim 1, wherein the at least one primary valve comprises at least one umbrella valve configured to allow air to flow from the hollow air channel out of the probe tip.

12. A probe assembly for a closed transfer system coupler, the coupler including a housing and a handle, the coupler configured to couple a fluid-filled container into a fluid-tight configuration with the coupler and selectively actuate the probe assembly to protrude at least partially inside of the container by actuation of the handle, the probe assembly comprising:
   a base including a base air inlet, a base rinse inlet, and an interior seat;
   a probe defining a hollow air channel extending from the base to a probe tip, the hollow air channel in fluid communication with the base air inlet and the probe tip;
   at least one primary valve positioned at the probe tip; and
   at least one secondary valve positioned at the base air inlet and configured to selectively allow air into the hollow air channel, wherein
   the probe engages the interior seat and fluidly isolates the base air inlet from the base rinse inlet.

13. The probe assembly of claim 12, wherein the base includes an air chamber in fluid communication with the base air inlet and the hollow air channel, the air chamber including a bottom surface that is positioned below the base air inlet to form a reservoir.

14. The probe assembly of claim 12, wherein the probe is arranged along a longitudinal axis and the base air inlet is tilted at an angle with respect to the longitudinal axis.

15. The probe assembly of claim 12, wherein a top of the base air inlet is angled toward a center of the base.

16. The probe assembly of claim 12, wherein the at least one primary valve is provided as a pair of umbrella valves configured to allow air to flow in parallel from the hollow air channel out of the probe tip.

17. The probe assembly of claim 12, wherein the at least one primary valve and the at least one secondary valve are configured as one-way valves.

18. The probe assembly of claim 17, wherein the at least one primary valve is configured to selectively allow air to flow into the base air inlet and into an air chamber formed within the base, the air chamber being in fluid communication with the hollow air channel.

19. A probe assembly for a closed transfer system coupler configured to selectively engage a container coupled to the coupler in a fluid tight configuration, the probe assembly comprising:
 a base including a base air inlet and a base rinse inlet;
 a probe defining a hollow air channel in fluid communication with the base air inlet, the probe including at least one primary valve; and
 at least one secondary valve configured to selectively allow air into the hollow air channel, wherein
 the probe is insertably received into the base, and
 the base air inlet is fluidly isolated from the base rinse inlet via an inner tube of the probe being coupled to the base.

20. The probe assembly of claim 19, wherein the probe includes a first end and a second end, the first end and the second end configured as opposing ends of the probe; and
 the at least one primary valve is proximate the first end and the at least one secondary valve is proximate the second end.

* * * * *